United States Patent [19]

Bolz et al.

[11] Patent Number: 4,974,215
[45] Date of Patent: Nov. 27, 1990

[54] LOADING DOCK RANGE FINDING SYSTEM

[75] Inventors: John Bolz, Colorado Springs; Craig Brunswick, Canon City; John Ivey, Canon City; David Klochan, Canon City; William Koch, Colorado Springs; Ken Pastotnik; Fred Wojciuch, both of Canon City, all of Colo.

[73] Assignee: Portec, Inc., Oak Brook, Ill.

[21] Appl. No.: 442,710

[22] Filed: Nov. 29, 1989

[51] Int. Cl.$^5$ .............................................. G01S 15/00
[52] U.S. Cl. .................................... 367/108; 367/909
[58] Field of Search ...................... 367/909, 112, 108; 340/943, 903, 705, 425.5

[56] References Cited

U.S. PATENT DOCUMENTS

| | | | |
|---|---|---|---|
| 3,226,673 | 12/1965 | Edwards | 367/909 |
| 3,673,553 | 6/1972 | Miura et al. | 367/909 |
| 3,732,555 | 5/1973 | Strenglein | 367/909 |
| 4,015,232 | 3/1977 | Sindle | 367/111 |
| 4,026,654 | 5/1977 | Beaurain | 356/5 |
| 4,240,152 | 12/1980 | Duncan et al. | 367/108 |
| 4,278,962 | 7/1981 | Lin | 367/909 |
| 4,455,096 | 6/1984 | Brandstedt . | |
| 4,464,738 | 8/1984 | Czajkowski | 367/97 |
| 4,467,313 | 8/1984 | Yoshino et al. | 340/904 |
| 4,569,037 | 2/1986 | Seiferling | 367/108 |
| 4,636,997 | 1/1987 | Toyama et al. | 367/140 |
| 4,785,429 | 11/1988 | Folwell et al. | 367/909 |

Primary Examiner—Thomas H. Tarcza
Assistant Examiner—Daniel T. Pihulic
Attorney, Agent, or Firm—Hill, Van Santen, Steadman & Simpson

[57] ABSTRACT

A loading dock range finding system is provided for permitting a driver of a vehicle backing towards a loading dock to determine a distance of the back end of the vehicle from a reference point at the loading dock. An ultrasonic transmitting and receiving transducer is positioned adjacent the loading dock for sending signals towards a back end of the truck, which are reflected and received by the transducer. A display unit is connected to the transducer and is mounted at a location adjacent the loading dock so that a visual display on the display unit can be easily viewed by a driver of the vehicle looking through his rear view mirror. A distance between the back end of the vehicle and the reference point is displayed in reversed image fashion on the visual display so that when the driver views the image through his rear view mirror, it is not a reversed image.

14 Claims, 3 Drawing Sheets

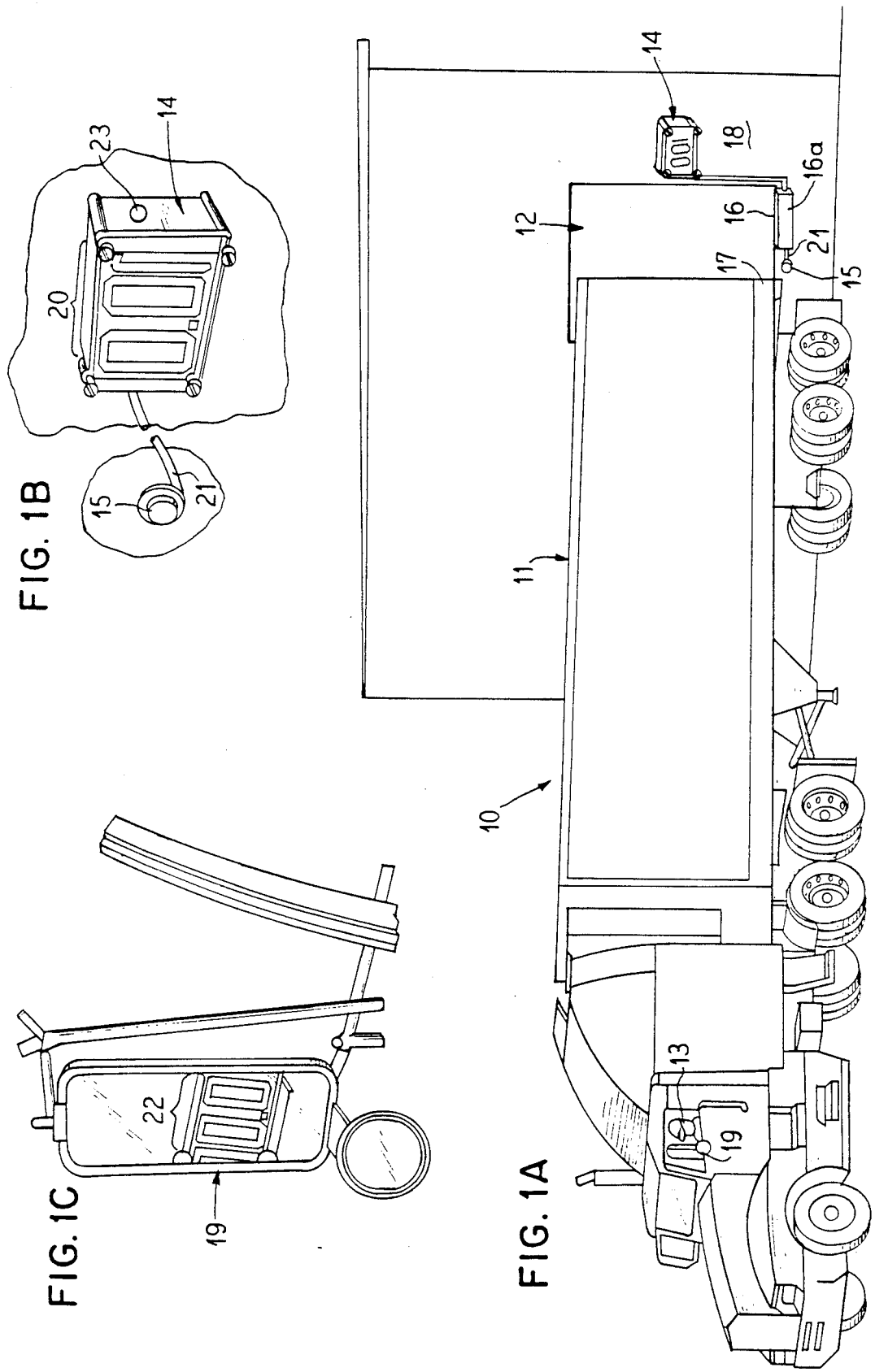

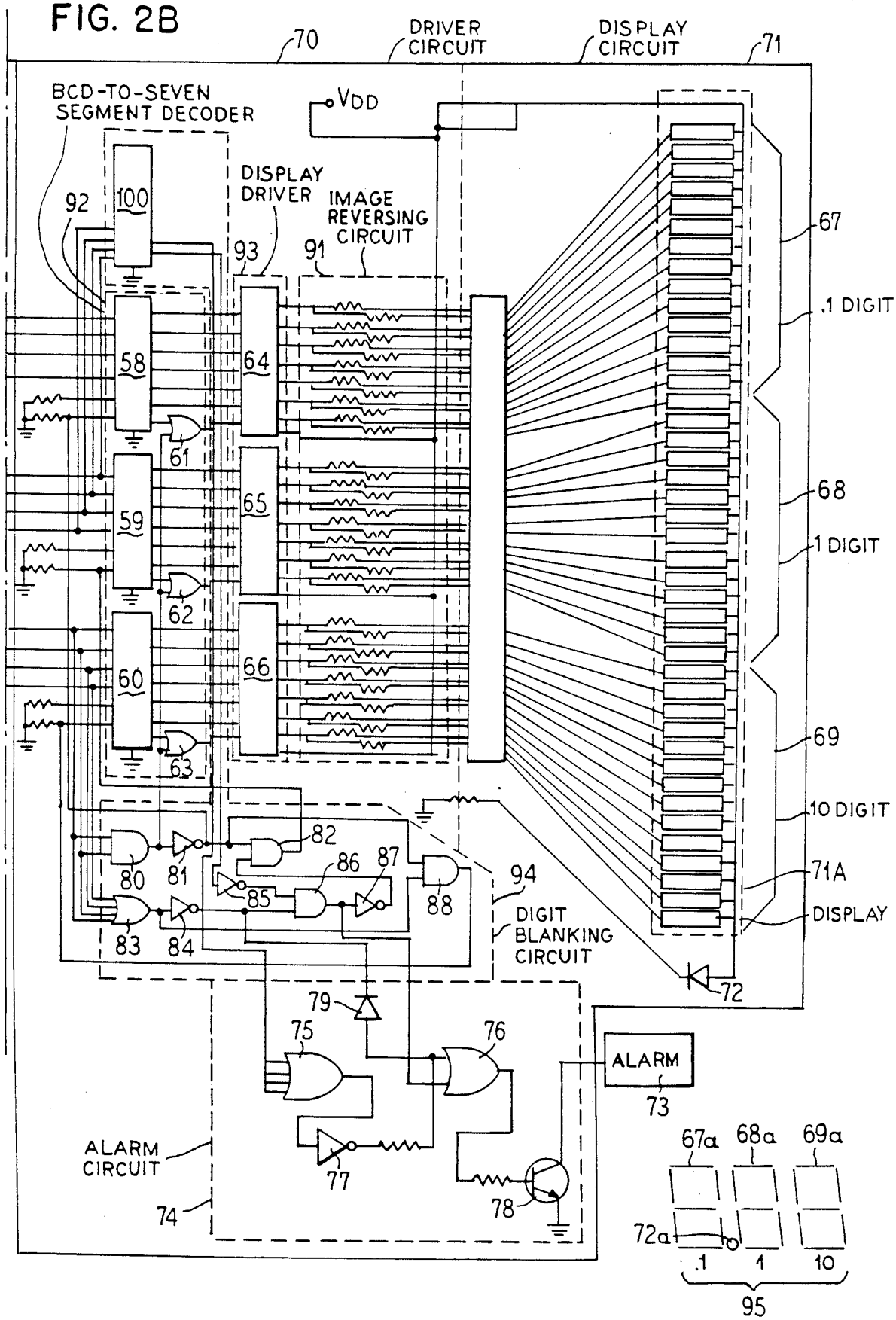

LOADING DOCK RANGE FINDING SYSTEM

BACKGROUND OF THE INVENTION

When backing up material hauling vehicles such as semitrailers and others types of trucks used for transporting goods to a loading dock, because of the long length of the truck there is a danger that the rear end of the truck will hit, and possibly damage the loading dock. The truck may also be damaged Typically, a driver of a semi-trailer truck, for example, will attempt to determine how close the back-end of his truck is to the loading dock as he backs toward the loading dock. Because of the distances and depth perception problems involved, it is very difficult for the driver to accurately judge how close the back end of his truck is to the loading dock. Consequently, additional personnel will be required to assist the driver in backing up to the loading dock.

SUMMARY OF THE INVENTION

It is an object of the present invention to disclose a system which will allow the driver of a vehicle such as a truck who is backing up towards a loading dock, to conveniently and accurately determine, without assistance by additional personnel, the decreasing spacing between the back end of his truck and the loading dock as he backs towards the dock.

It is a further object of the invention to allow the driver of the vehicle to be loaded to employ his rear view mirror to accurately determine the decreasing distance between the back of his truck and the loading dock as he backs towards the dock.

It is another object of the invention to eliminate the need for additional personnel to guide the driver of the vehicle when he backs his vehicle towards the loading dock.

According to the invention, a reverse reading display is provided adjacent the loading dock which will display the decreasing distance between the back end of the truck and the loading dock as the driver backs the truck towards the loading dock. The driver of the vehicle views the display through his rearward looking mirror or mirrors such that the reverse image reading is no longer reversed and can be correctly read when the driver views the image in his mirror.

According to a further aspect of the invention, an ultrasonic transmitter and receiver system is employed to monitor on a substantially continuous basis the decreasing spacing between the rear of the truck and the loading dock. Ranging signals from the ultrasonic system are decoded and converted to digital distance indications which are then provided to a digital display with an image reversing means so that the image will be read out on the display in image reversed fashion. The display is provided sufficiently large to easily enable a viewer looking through his rear view mirror to read the display.

According to a further object of the invention, adjustment means are provided for accurately calibrating the system such that when the rear end of the truck touches a bumper or other reference point associated with a loading dock, the digital readout will be zero.

In accordance with a further advantage of the invention, an alarm system may be triggered when a predetermined spacing distance which is very small or zero, for example between the reference point and the truck, is achieved.

BRIEF DESCRIPTION OF THE DRAWINGS

FIG. 1A is a perspective view showing the loading dock range finding system of the invention wherein a semi-trailer truck or the like is being backed towards the loading dock, the system providing a substantially continuous digital readout of the spacing between the loading dock and the back end of the truck;

FIG. 1B is a detail of the image display box shown in FIG. 1A;

FIG. 1C is an enlarged more detailed view of the mirror being used by the driver of the truck to read the reversed image display at the loading dock; and FIGS. 2A and 2B are a combination block diagram and circuit diagram showing one embodiment for the electronics for the system of the invention.

DESCRIPTION OF THE PREFERRED EMBODIMENT

Figure 2A:
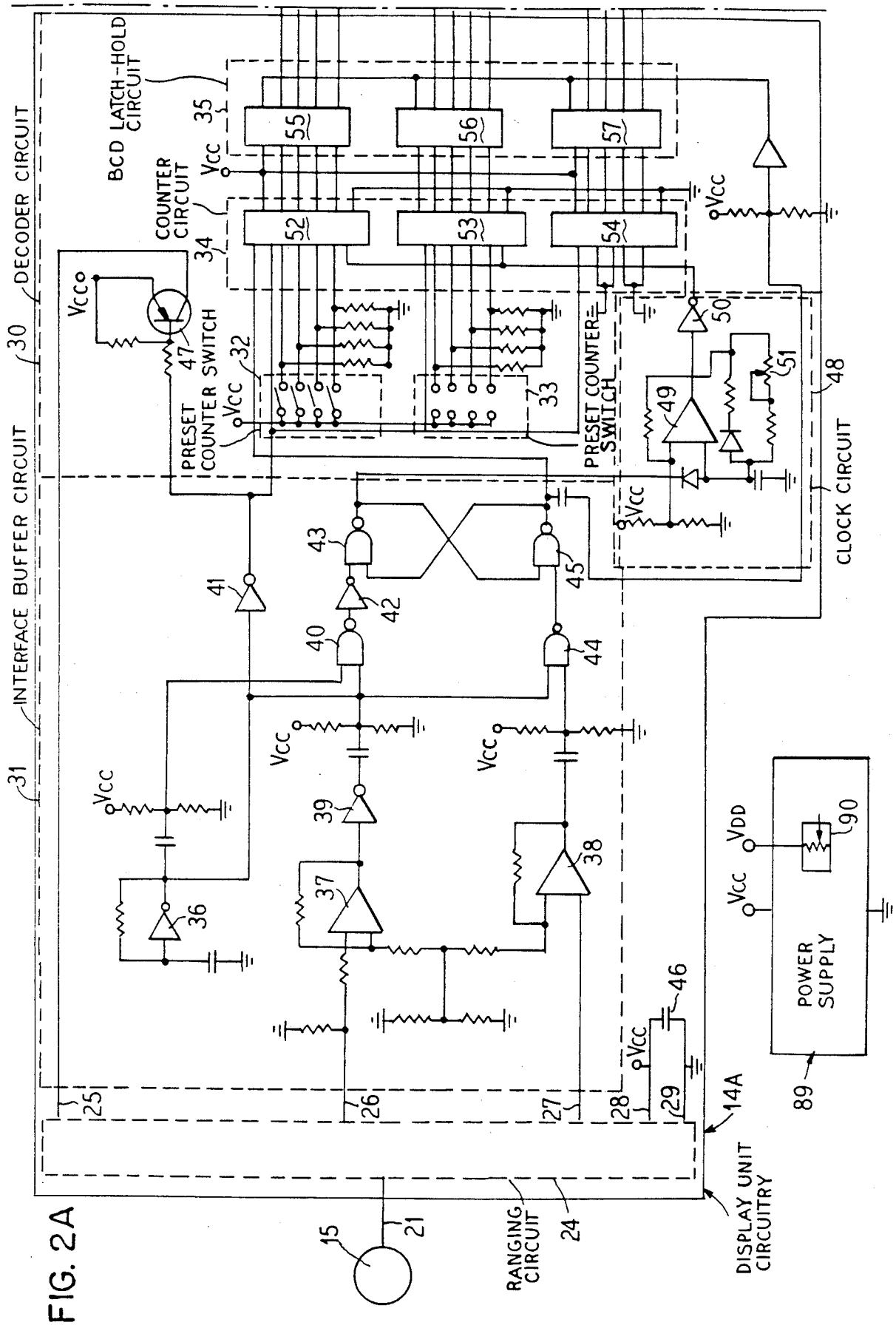

As generally shown at 10 in FIG. 1A, a vehicle such as a semi-trailer truck 11 is shown backing towards a loading dock 12. A reverse image display unit 14 displays the reverse image "0.01" (indicative of 10 feet) which is read by the vehicle driver 13 when the back end 17 of the truck trailer 11 is ten feet away from a reference point or surface 16a, such as the surface of a bumper cushion 16. An ultrasonic transmitter/receiver transducer 15 connects via cable 21, to the image display unit 14. The image display unit 14 is typically mounted alongside the loading dock 12 such as on a wall 18 thereof at a location which will permit easy viewing by the driver 13 through his rearward looking mirror 19.

The image display unit 14 has a three digit image display 20 (see FIG. 1B) formed of a tens digit, a ones digit, a decimal point, and a tenths digit. To permit easy viewing by the driver at a distance such as 30 or 40 feet, for example, each of the digits should have a minimum width of at least approximately 1½ inches and a height of at least 3 inches.

As shown in FIG. 1B, the image display unit 14 preferably has a brightness adjust aperture 23 to permit access to a brightness adjust control within the unit 14 to adjust brightness of the images being displayed. Alternatively, of course, the control could be directly mounted on a side of the unit 14 for easier operator access.

As described hereafter, an inside of the unit 14 may be accessible such as by having a removable face panel. This permits adjustment of internal controls to set a zero adjust to calibrate the system during installation. Such a calibration is employed so that when the back end of the truck 17 is just touching the reference surface 16a, the digital display will read zero, even though the ultrasonic transducer 15 may still be spaced some distance from the back end of the truck 17 from which it is receiving reflections in order to determine by ultrasonics the distance readings.

As shown in FIG. 1C, the corrected image 22 can be read by the driver in the mirror 19 since the mirror reverses the image shown at 20 in FIG. 1B.

Referring now to FIGS. 2A and 2B, various circuit blocks are illustrated. The ultrasonic transducer 15 which transmits and receives ultrasonic waves is, for example, part No. 6604142 of the Polaroid Corporation. The transducer 15 connects via the cable 21 to circuitry 14A contained within the display unit 14. First, signals from the transducer 15 are fed to a ranging circuit 24 which in this embodiment is the Polaroid printed circuit board 607089 of the Polaroid Corporation. The ranging circuit 24 is connected via an interface buffer circuit 31 to a decoder circuit 30 having a number of sub-circuit blocks described hereafter. The decoder circuit 30 is connected to a driver circuit 70 (FIG. 2B) which is connected to a display circuit 71. Each of the aforementioned circuits also has additional circuit blocks associated therewith which will be described hereafter. Of course, a power supply 89 is also provided (FIG. 2A).

The ranging circuit 24 has an input 25 receiving a switched voltage serving to energize the transmitter portions of the ranging circuit 24 and transducer 15. Driver transistor 47 and its associated components provide such a energizing switch voltage for transmitting.

An output 26 of ranging circuit 24 provides a pulse corresponding to a detected ultrasonic echo signal. The leading edge of this pulse is used. The width of the pulse determines the strength of the echo. An output 27 from ranging circuit 24 provides a start timing signal as a leading edge of a pulse corresponds to transmission of the ultrasonic pulse towards the truck. Of course the start timing pulses have a periodic frequency such as approximately 60 cycles to periodically sample the distance spacing of the truck from the loading dock. Accordingly, a substantially continuous indication of the truck spacing from the loading dock can thus be obtained. Corresponding echo signals, of course, result, when such outgoing ultrasonic signals are bounced off the rear of the truck, and are detected. Terminals 28 and 29 of ranging circuit 24 respectively correspond to the power source VCC and ground. A filter capacitor 46 may be provided at this point.

The ranging circuit 24 connects with the interface-buffer circuit 31. Circuit 31 includes integrated logic elements 36, 37, 38, 39, 40, 41, 42, 43, 44, and 45 as shown. This circuit provides an interface to convert the signals from the ranging circuit to an acceptable format for input to a following counter circuit 34 formed of counter chips 52, 53, and 54 (known in the industry as integrated circuit generic part number 4029). Such counter integrated chips, of course, are driven by a clock circuit 48 having a clock circuit adjust control 51 together with logic elements 49 and 50. The clock circuit 48 provides a time base to drive the counter circuits.

The counter chips have connected thereto respective first and second counter switches 32 and 33 which are preferably ten position rotary switches. The counter switch 32 represents a one-tenth foot adjustment and counter switch 33 represents a one foot adjustment. When the truck is backed up such that the back end of the truck is touching the reference point at the loading dock, or is at some desired predetermined spacing from the reference point, the switches 32 and 33 allow the system to by preset such that the display will read zero at such point. This is an adjustment which the installer of the system may make when he is setting up the system.

The counter circuit 34 outputs to a BCD-hold latch circuit 35 formed of integrated chips 55, 56, and 57 (known in the industry as integrated circuit generic part Nos. 4071, 4072, and 4081, respectively) connected in known fashion to provide a holding function such that the data being held can be displayed.

The BCD-hold latch circuit 35 in turn drives a BCD-2-7 segment decoder circuit 92 formed of integrated chips 58, 59, and 60 (known in the industry as integrated circuit generic part No. 4511) and logic elements 61, 62, and 63. In order to drive a display wherein each digit is formed of seven segments, such a decoder is necessary to convert the BCD data to the seven segment driving requirements for the display. A display driver 93 receives the outputs from circuit 92 and is formed of integrated chips 64, 65, and 66 (known in the industry as integrated circuit generic part No. 2004). The display driver then drives each one of the seven segments of each of the three digits of the display 71A via an image reversing circuit 91 formed of a resistor network wired so that the images output at each of the digits 67 (tenths digit), 68 (ones digit), and 69 (tens digit) is a reverse image. As shown in the drawing, each of the digits is formed of seven segments such as by use of known luminescent technology display segments. Also a decimal point 72A is provided by the LED diode 72 which is supplied with power as shown in the drawing.

A digit blanking circuit 94 is provided such that only the most significant digit will be shown by the LED display. This digit blanking circuit 94 is formed as shown with logic elements 80, 81, 82, 83, 84, 85, 86, 87, and 88 and integrated chip 100 (known in the industry as integrated circuit generic part No. 74HC154).

An alarm circuit 74 formed of logic circuit elements 75, 76, and 77 together with transistor 78 and diode 79 provides a voltage for driving an alarm 73 when the display reads "0" as described previously. Thus, when the back end of the truck is at the reference point, an alarm may also be activated. The alarm, of course, could be an audible alarm or a visible alarm.

The power supply circuit 89 is shown in FIG. 2A, and supplies the voltages VCC and VDD to the previously described circuits. A display brightness control 90 is preferably associated with the power supply 89 so that the voltage VDD fed to the display can be adjusted so as to adjust brightness of the display circuit 71 and its individual digits 67, 68, and 69.

FIG. 2B also shows at 95 the seven segment digits 67a, 68a, and 69a.

Although various minor changes and modifications might be proposed by those skilled in the art, it will be understood that we wish to include within the claims of the patent warranted hereon all such changes and modifications as reasonably come within our contribution to the art.

We claim as our invention:

1. A truck loading dock range finding system for permitting a driver of a truck backing towards a truck loading dock to determine a distance of a back end of the truck from a reference point at the loading dock, and wherein the truck backing towards the loading dock has a rear view mirror mounted on a side of the truck, comprising;

a truck loading dock and a defined reference point at the loading dock;

first means mounted at the loading dock for substantially continuously determining a decreasing distance between the back end of the truck and the reference point at the loading dock as the truck backs toward the reference point; and second means connected to the first means for displaying an image in mirror image reversed fashion, based on the measured decreasing distance, said second means for displaying being mounted alongside the loading dock in a position so as to permit the driver of the truck to read the reversed image by use of the rearward looking mirror on the side of the truck.

2. A system according to claim 1 wherein the first means includes calibration means for setting the image displayed to zero for a given reference position of the back end of the truck relative to the reference point.

3. A system according to claim 2 wherein the image displayed is zero when the back end of the truck just touches the reference point.

4. A system according to claim 2 wherein a third means is connected to provide an alarm signal when the image displayed is zero.

5. A system according to claim 2 wherein said given reference position is the back end of the truck just touching the reference point.

6. A system according to claim 1 wherein said second means has an image display means for displaying a tens digit, a ones digit, a decimal point, and a tenths digit.

7. A system according to claim 1 wherein said second means has an image display means for displaying numerical digits, and each of the digits is at least one and one-half inches wide and at least three inches high.

8. A system according to claim 1 wherein said first means includes an ultrasonic transmitting and receiving transducer means for sending a transmitted ultrasonic wave towards the back end of the truck so as to cause an echo signal to be reflected which is received by said same transducer means.

9. A system according to claim 1 wherein said first means includes a transmitting and receiving transducer mounted at the loading dock and said second means is remotely positioned with respect to said transducer means, and wherein for a given location of the truck, a distance from the back end of the truck to the transducer means is greater than a distance from the reference point to the back end of the truck so that the truck will make physical contact with the reference point before it hits the transducer means.

10. A truck loading dock range finding system for permitting a driver of a truck backing towards a truck loading dock to determine a distance of a back end of the truck from a reference point at the loading dock, comprising:
a truck loading dock and a reference point at the loading dock;
a transmitting and receiving transducer means mounted adjacent the loading dock and for projecting signals toward a back end of a truck backing toward the loading dock, and for receiving signals reflected by the back end of the truck;
a display unit connected by wiring to the transducer means, said display unit being also mounted but spaced from said transducer means at another location alongside the loading dock in a position such that a visual display on the display unit can be easily viewed by a driver of the truck when looking through a rear view mirror on a side of the truck; and
said display unit having decoding means for decoding signals from the transducer means so as to substantially continuously determine a decreasing distance between the back end of the truck and the reference point associated with the loading dock as the truck backs toward the loading dock, and means for providing signals to the visual display to numerically display said distance as a reversed image.

11. A system according to claim 10 wherein the transducer means is mounted directly adjacent a bumper cushion at the loading dock which the back end of the truck strikes as it backs toward the loading dock.

12. A truck loading dock range finding system for permitting a driver of a truck backing towards a loading dock to determine a distance of a back end of the truck from a reference point at the loading dock, comprising:
a truck loading dock having a reference point at the loading dock;
an ultrasonic transmitting and receiving transducer means positioned adjacent the loading dock;
a display unit connected by wiring to the transducer means, said display unit being also mounted but spaced from said transducer means at another location alongside the loading dock in a position such that a visual display on the display unit can be easily viewed by a driver of the truck through a rearward view mirror mounted on a side of the truck;
said display unit having decoding means for decoding signals from the transducer means so as to substantially continuously determine decreasing distance between the back end of the truck and the reference point associated with the loading dock as the truck backs toward the loading dock, and means for providing signals to the visual display to numerically display said decreasing distance; and
image reversing circuit means being provided for reversing in mirror image fashion digits to be displayed by said visual display so as to allow the driver of the truck to view a reverse image on the visual display through his mirror such that when the driver sees the image in the mirror it is not reversed.

13. A system according to claim 12 wherein said decoding means comprises a ranging circuit means for providing signals indicative of the distance from the ultrasonic transducer means and the back end of the truck, a counter circuit means connected to the ranging circuit means for determining through counting the distance, a holding circuit means for holding the determined distance, and a display driver means connected to the holding circuit means for providing the numerical distance to the visual display.

14. A system according to claim 12 wherein the visual display comprises at least three digits each of which is formed by segments, and wherein means is provided for converting the distance so as to appropriately drive respective ones of each of the seven segments of each of the digits to be displayed.

* * * * *